(12) United States Patent
Adir et al.

(10) Patent No.: US 10,397,259 B2
(45) Date of Patent: Aug. 27, 2019

(54) CYBER SECURITY EVENT DETECTION

(71) Applicant: International Business Machines Corporation, Armonk, NY (US)

(72) Inventors: Allon Adir, Kiryat Tivon (IL); Ehud Aharoni, Kfar Saba (IL); Lev Greenberg, Haifa (IL); Rosa Miroshnikov, Vaughan (CA); Boris Rozenberg, Ramat Gan (IL); Oded Sofer, Midreshet Ben Gurion (IL)

(73) Assignee: International Business Machines Corporation, Armonk, NY (US)

( * ) Notice: Subject to any disclaimer, the term of this patent is extended or adjusted under 35 U.S.C. 154(b) by 177 days.

(21) Appl. No.: 15/466,892

(22) Filed: Mar. 23, 2017

(65) Prior Publication Data

US 2018/0278634 A1 Sep. 27, 2018

(51) Int. Cl.
*H04L 29/06* (2006.01)
*G06F 21/55* (2013.01)
*G06F 21/57* (2013.01)

(52) U.S. Cl.
CPC ........ *H04L 63/1425* (2013.01); *G06F 21/552* (2013.01); *G06F 21/577* (2013.01); *H04L 63/1441* (2013.01)

(58) Field of Classification Search
CPC ............. H04L 63/1425; H04L 63/1441; G06F 21/552; G06F 21/577
See application file for complete search history.

(56) References Cited

U.S. PATENT DOCUMENTS

| | | | |
|---|---|---|---|
| 9,166,993 | B1 | 10/2015 | Liu |
| 2009/0018983 | A1 | 1/2009 | El-Rafei et al. |
| 2011/0055920 | A1* | 3/2011 | Hariri ................... G06F 21/552 726/22 |
| 2012/0137367 | A1 | 5/2012 | Dupont et al. |
| 2014/0279740 | A1* | 9/2014 | Wernevi ................. G06F 19/00 706/12 |

(Continued)

OTHER PUBLICATIONS

Philip K. Chan, et al.; "Learning Rules and Clusters for Anomaly Detection in Network Traffic"; Managing Cyber Threats, vol. 5 of the series Massive Computing; 2005; 21 pages http://cs.fit.edu/~pkc/papers/cyber.pdf.

(Continued)

*Primary Examiner* — Ghodrat Jamshidi
(74) *Attorney, Agent, or Firm* — Barry Blount

(57) ABSTRACT

A system for detecting cyber security events can include a processor to generate a first set of a plurality of time series and aggregate statistics based on a plurality of properties corresponding to user actions for each user in a set of users. The processor can also separate the set of users into a plurality of clusters based on the first set of the plurality of time series or aggregate statistics for each user and assign an identifier to each of the plurality of clusters. Additionally, the processor can generate a second set of a plurality of time series based on properties of the plurality of clusters, wherein the properties of a cluster correspond to a membership, a diameter, and a centroid and detect an anomaly based on a new value stored in the second set of the time series. Furthermore, the processor can execute a prevention instruction.

17 Claims, 5 Drawing Sheets

(56) References Cited

U.S. PATENT DOCUMENTS

| | | | |
|---|---|---|---|
| 2014/0310235 A1* | 10/2014 | Chan | G06F 17/30598 |
| | | | 707/603 |
| 2015/0067845 A1* | 3/2015 | Chari | G06F 21/50 |
| | | | 726/23 |
| 2015/0073981 A1 | 3/2015 | Adjaoute | |
| 2015/0302433 A1* | 10/2015 | Li | 705/31 |
| 2016/0065611 A1* | 3/2016 | Fakeri-Tabrizi | H04L 63/1425 |
| | | | 726/23 |
| 2016/0139575 A1* | 5/2016 | Funes | H04L 12/2834 |
| | | | 700/275 |
| 2016/0226901 A1* | 8/2016 | Baikalov | H04L 63/1425 |
| 2016/0328654 A1* | 11/2016 | Bauer | G06N 5/048 |
| 2017/0149813 A1* | 5/2017 | Wright | H04L 63/1425 |
| 2018/0077175 A1* | 3/2018 | DiValentin | G06F 17/30551 |
| 2018/0077182 A1* | 3/2018 | Sartran | H04L 63/1425 |
| 2018/0219889 A1* | 8/2018 | Oliner | H04L 63/1425 |
| 2018/0288691 A1* | 10/2018 | Chen | H04W 48/18 |

OTHER PUBLICATIONS

Haiyan Qiao; "Behavior Analysis-Based Learning Framework for Host Level Intrusion Detection"; 14th Annual IEEE International Conference and Workshops on the Engineering of Computer-Based Systems (ECBS'07)Date of Conference: Mar. 26-29, 2007, 7 pages. http://ieeexplore.ieee.org/xpl/login.jsp?tp=&arnumber=4148961&url=http%3A%2F%2Fieeexplore.ieee.org%2Fxpls%2Fabs_all.jsp%3Farnumber%3D4148961.

Atul Bohara, et al.; "Intrusion Detection in Enterprise Systems by Combining and Clustering Diverse Monitor Data"; Proceeding HotSos '16 Proceedings of the Symposium and Bootcamp on the Science of Security; Apr. 19-21, 2016; 10 pages. http://dl.acm.org/citation.cfm?id=2898400.

\* cited by examiner

CYBER SECURITY EVENT DETECTION

BACKGROUND

The present disclosure relates to cyber security, and more specifically, but not exclusively, to detecting cyber security events based on time series.

SUMMARY

According to an embodiment described herein, a system for detecting cyber security events can include a processor to generate a first set of a plurality of time series and aggregate statistics based on a plurality of properties corresponding to user actions for each user in a set of users. The processor can also separate the set of users into a plurality of clusters based on the first set of the plurality of time series or aggregate statistics for each user and assign an identifier to each of the plurality of clusters. Additionally, the processor can generate a second set of a plurality of time series based on properties of the plurality of clusters, wherein the properties of a cluster correspond to a membership, a diameter, and a centroid and detect an anomaly based on a new value stored in the second time series. Furthermore, the processor can execute a prevention instruction in response to detecting the anomaly.

According to another embodiment, a method for detecting cyber security events can include generating a first set of a plurality of time series and aggregate statistics based on a plurality of properties corresponding to user actions for each user in a set of users. The method can also include separating the set of users into a plurality of clusters based on the first set of the plurality of time series for each user and assign an identifier to each of the plurality of clusters. Additionally, the method can include generating a second set of a plurality of time series based on properties of the plurality of clusters, wherein the properties of a cluster correspond to a membership, a diameter, and a centroid and detecting an anomaly based on a new value stored in the second time series. Furthermore, the method can include executing a prevention instruction in response to detecting the anomaly.

According to another embodiment, a computer program product for detecting cyber security events can include a computer readable storage medium having program instructions embodied therewith, wherein the computer readable storage medium is not a transitory signal per se. The program instructions can be executable by a processor to cause the processor to generate a first set of a plurality of time series and aggregate statistics based on a plurality of properties corresponding to user actions for each user in a set of users. The processor can also separate the set of users into a plurality of clusters based on the first set of the plurality of time series or aggregate statistics for each user and assign an identifier to each of the plurality of clusters. Additionally, the processor can generate a second set of a plurality of time series based on properties of the plurality of clusters, wherein the properties of a cluster correspond to a membership, a diameter, and a centroid and detect an anomaly based on a new value stored in the second time series. Furthermore, the processor can execute a prevention instruction in response to detecting the anomaly.

DETAILED DESCRIPTION

Figure 1:
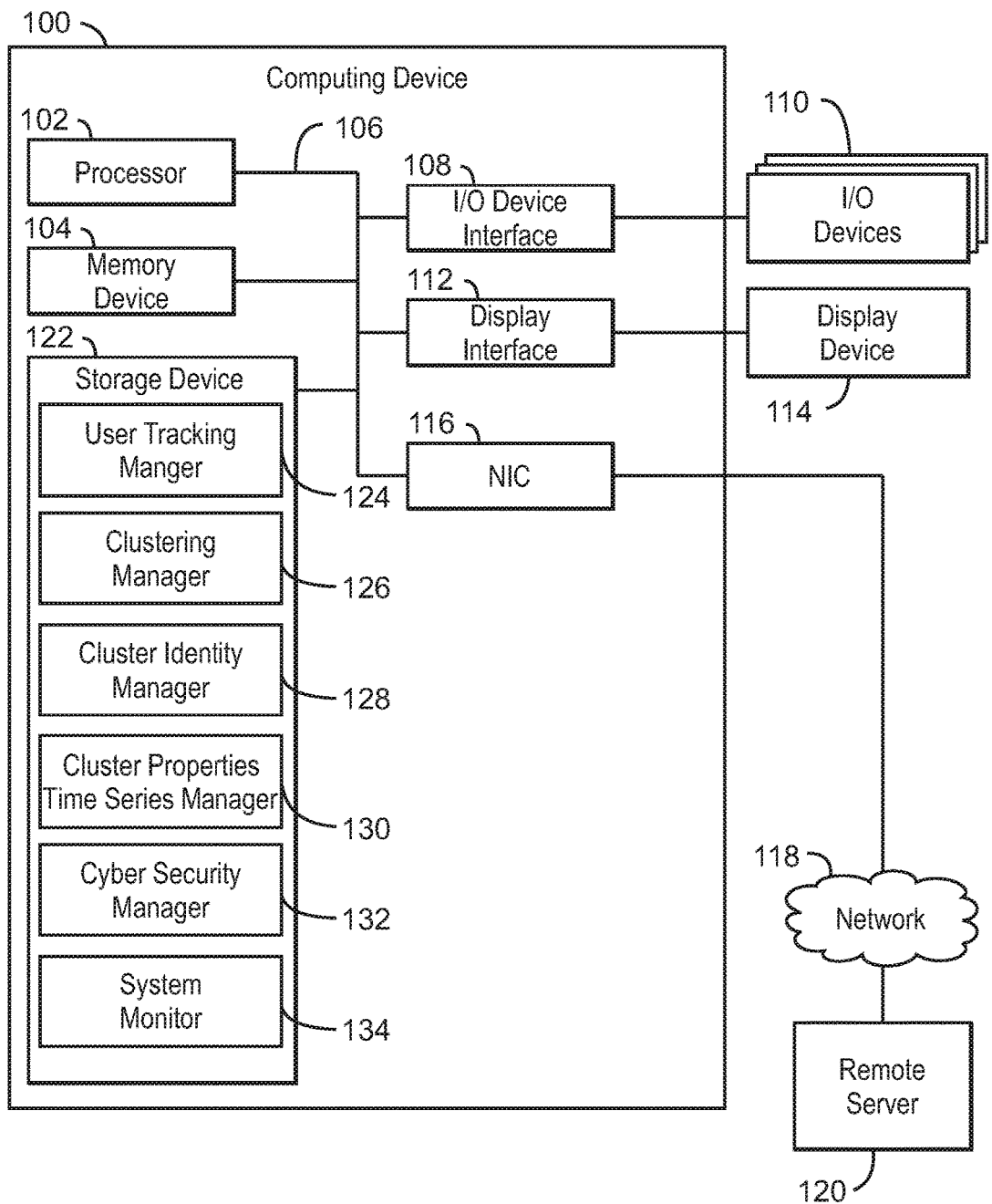
FIG. 1 depicts a block diagram of an example computing system that can detect a cyber security event based on a time series according to an embodiment described herein.

A cyber-attack is any malicious attempt to steal, alter, or destroy a specified target by hacking into a computer system. The techniques described herein include generating time series based on tracking user actions on a computer system (e.g., a database), clustering the users according to collected data, generating further time series by tracking changes in clusters, and performing anomaly detection on these time series. Cyber security events are expected to generate anomalous patterns in clusters properties, therefore the techniques are useful for detecting cyber security events.

In some embodiments, the techniques described herein include a software application or tool that can monitor and track data for any number of users. For example, a device for detecting cyber security events can generate a plurality of time series for a plurality of properties. In some examples, a time series, as referred to herein can indicate sequential values corresponding to the properties based on time. The properties may refer to files, directories, databases, and the like, that a user has accessed or modified. In some examples, the time series can correspond to a number of times each user accesses data within a sequence of time periods. For example, the time series can indicate that a user accesses a database table a certain number of times for each hour in a twenty-four hour period. A cluster can include a group of users with similar properties. For example, each cluster may refer to a group of users that access or modify particular files or databases. In some examples, any suitable clustering technique can be utilized to generate clusters of users, which are disjoint and can include an entire set of users. In some embodiments, the clustering is performed periodically such as on a weekly basis, or any other suitable time period. In some examples, a new set of clusters is detected each week, which can indicate if a user has moved from a first cluster to a second cluster. In some embodiments, various properties of the clusters may be used for creating a plurality of additional time series. These properties may include a diameter of a cluster, variance of the distance of each member and a centroid, and the like.

In some embodiments, the device can also detect an anomaly based on a new value in the time series. Anomaly detection based on a time series, as referred to herein, can include comparing the last or most recent value stored in a time series with the previous values stored in the time series, and deciding whether this new value is anomalous. For example, techniques for anomaly detection described herein can include computing the mean and standard deviation of all the values in a time series except the most recent value, and testing if the most recent value is above some threshold of standard deviations away from the mean. In some examples, such anomaly detection can be performed every time a new value is added to the time series. In some embodiments, the new value in the time series can correspond to any number of operations executed by a user within a time period. For example, an operation performed by a user may not correspond to previous time series data. As described below in greater detail, a user that accesses a database table for a number of time periods, wherein each time period the user accesses the table a number of times where the number is within some range, followed by a time period with a number of database table accesses above this range may indicate an anomalous action. Furthermore, the device can execute a prevention instruction in response to detecting the anomaly. For example, the device can prevent all activities of the user which the anomaly is associated with.

Accordingly, the techniques described herein can reduce a number of unauthorized operations performed by a computing device or remote service provider. Furthermore, the techniques described herein can prevent the execution of operations that may result in an unauthorized access of data from a computing device, mobile device, server, or any other suitable device. The techniques described herein can also detect if a user changes their behavior gradually and slowly, with malicious intent to avoid detection, by monitoring cluster changes associated with the user. Common techniques will fail to discover such an action also referred to as an "encroaching breach."

With reference now to FIG. 1, an example computing device is depicted that can detect cyber security events. The computing device 100 may be for example, a server, desktop computer, laptop computer, tablet computer, or smartphone. In some examples, computing device 100 may be a cloud computing node. Computing device 100 may be described in the general context of computer system executable instructions, such as program modules, being executed by a computer system. Generally, program modules may include routines, programs, objects, components, logic, data structures, and so on that perform particular tasks or implement particular abstract data types. Computing device 100 may be practiced in distributed cloud computing environments where tasks are performed by remote processing devices that are linked through a communications network. In a distributed cloud computing environment, program modules may be located in both local and remote computer system storage media including memory storage devices.

The computing device 100 may include a processor 102 that is adapted to execute stored instructions, a memory device 104 to provide temporary memory space for operations of said instructions during operation. The processor can be a single-core processor, multi-core processor, computing cluster, or any number of other configurations. The memory 104 can include random access memory (RAM), read only memory, flash memory, or any other suitable memory systems.

The processor 102 may be connected through a system interconnect 106 (e.g., PCI®, PCI-Express®, etc.) to an input/output (I/O) device interface 108 adapted to connect the computing device 100 to one or more I/O devices 110. The I/O devices 110 may include, for example, a keyboard and a pointing device, wherein the pointing device may include a touchpad or a touchscreen, among others. The I/O devices 110 may be built-in components of the computing device 100, or may be devices that are externally connected to the computing device 100.

The processor 102 may also be linked through the system interconnect 106 to a display interface 112 adapted to connect the computing device 100 to a display device 114. The display device 114 may include a display screen that is a built-in component of the computing device 100. The display device 114 may also include a computer monitor, television, or projector, among others, that is externally connected to the computing device 100. In addition, a network interface controller (NIC) 116 may be adapted to connect the computing device 100 through the system interconnect 106 to the network 118. In some embodiments, the NIC 116 can transmit data using any suitable interface or protocol, such as the internet small computer system interface, among others. The network 118 may be a cellular network, a radio network, a wide area network (WAN), a local area network (LAN), or the Internet, among others. A remote server 120 may connect to the computing device 100 through the network 118. In some examples, the remote server 120 can send an authentication request for a transaction to the computing device 100.

The processor 102 may also be linked through the system interconnect 106 to a storage device 122 that can include a hard drive, an optical drive, a USB flash drive, an array of drives, or any combinations thereof. In some examples, the storage device 122 may include a user tracking manager 124, a clustering manger 126, a cluster identity manager 128, a cluster properties time series manager 130, a cyber security manager 132, and a system monitor 134. In some embodiments, the user tracking manager 124 can generate a first set of plurality of time series based on a plurality of properties corresponding to user actions for each user in a set of users. Additionally, the user tracking manager 124 may generate a plurality of aggregate statistics based on a plurality of properties, summarizing a user's activity in the recent past. In some examples, such aggregate statistics may include an average, standard deviation, exponential smoothing average, and the like. As one example illustrated in Table 1 below, the user tracking manager 124 can monitor an average number of accesses each user performs on each of the database tables X, Y, and Z.

TABLE 1

| User | Table X | Table Y | Table Z |
| --- | --- | --- | --- |
| A | 20% | 10% | 80% |
| B | 30% | 0% | 85% |
| C | 25% | 5% | 90% |
| D | 0% | 70% | 20% |
| E | 0% | 80% | 30% |

As shown in Table 1, for example, user B accesses table X in 30% of the hours, and never access table Y. Also, user D accesses table Y 70% of the hours, but never accesses table X. Accordingly, Table 1 provides aggregate statistics for each user and database table. In some embodiments, the clustering manager 126 can use a clustering algorithm to detect cluster that includes users A, B, and C. The clustering manager 126 can also detect a cluster that includes users D and E. In some examples, the users in each cluster can change between time periods. For example, a week later, the user tracking manager 124 may detect that user C has not accessed the database table X, and clustering manager 126 will produce a new set of clusters: one that includes users A and B, and a cluster that includes C, D, and E.

In some embodiments a cluster identity manager 128 can assign identifiers to each of the plurality of clusters. For example, in the first week it will assign the identifier C1 to the cluster that contained A, B, and C, and the identifier C2 to the cluster that contains D and E. In the second week, it may keep the same identifiers if the new clusters are similar to the old ones. For example, the cluster that contains A and B is similar to C1 that previously contained A, B, and C. Therefore it will again be assigned with the identifier C1.

Similarly, the new cluster that contains C, D, and E will be assigned with the identity C2 because of its similarity with the old C2 cluster.

In some embodiments, a cluster properties time series manager 130 can generate a second set of plurality of time series based on detected changes in the plurality of clusters, wherein the detected changes correspond to a change in cluster membership or a change in a cluster property. In some embodiments, the cyber security manager 132 can detect an anomalous action based on a new value in the second group of plurality of time series. For example, a user transitioning between certain clusters may indicate an anomalous action. In some examples, the system monitor 134 can execute a prevention instruction in response to detecting the anomalous event. This is described below in greater detail in relation to FIG. 2.

It is to be understood that the block diagram of FIG. 1 is not intended to indicate that the computing device 100 is to include all of the components shown in FIG. 1. Rather, the computing device 100 can include fewer or additional components not illustrated in FIG. 1 (e.g., additional memory components, embedded controllers, modules, additional network interfaces, etc.). Furthermore, any of the functionalities of the user tracking manager 124, clustering manger 126, cluster identity manager 128, cluster properties time series manager 130, cyber security manager 132, and system monitor 134 may be partially, or entirely, implemented in hardware and/or in the processor 102. For example, the functionality may be implemented with an application specific integrated circuit, logic implemented in an embedded controller, or in logic implemented in the processor 102, among others. In some embodiments, the functionalities of the user tracking manager 124, clustering manger 126, cluster identity manager 128, cluster properties time series manager 130, cyber security manager 132, and system monitor 134 can be implemented with logic, wherein the logic, as referred to herein, can include any suitable hardware (e.g., a processor, among others), software (e.g., an application, among others), firmware, or any suitable combination of hardware, software, and firmware.

Figure 2:
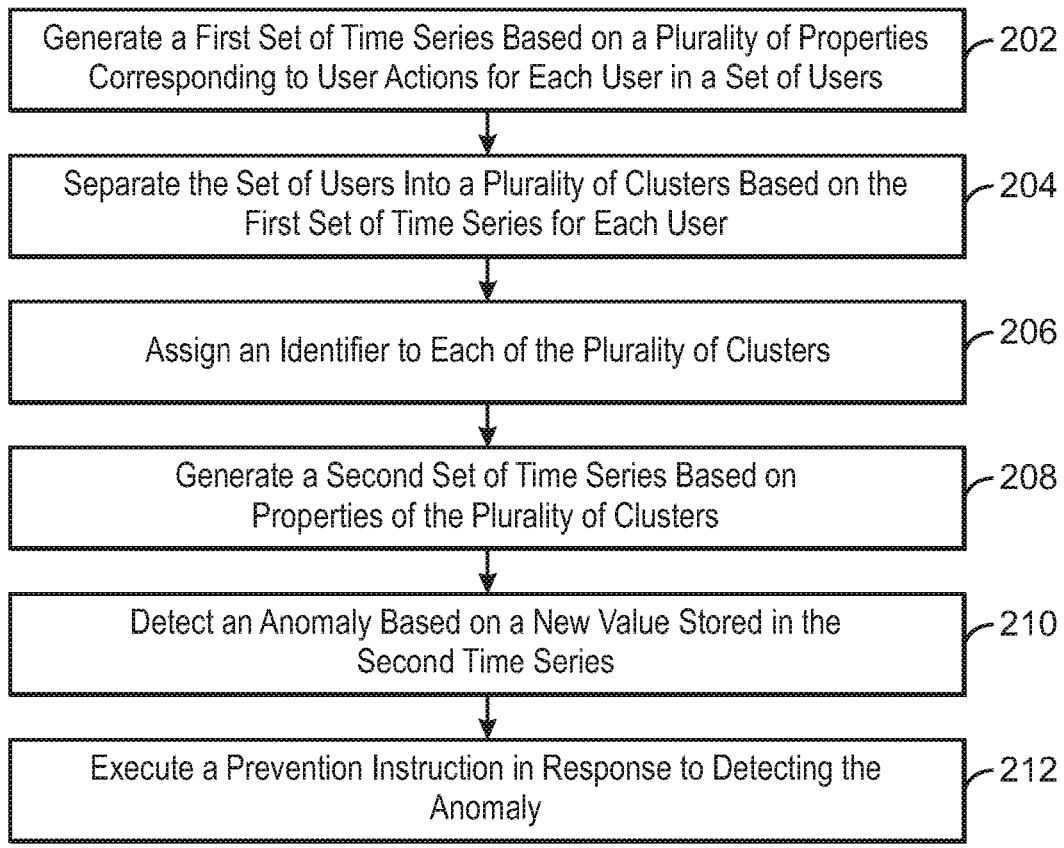
FIG. 2 is a process flow diagram of an example method that can detect a cyber security event based on a time series according to an embodiment described herein.

FIG. 2 is a process flow diagram of an example method that can detect cyber security events based on time series. The method 200 can be implemented with any suitable computing device, such as the computing device 100 of FIG. 1.

At block 202, a user tracking manager 124 can generate a first set of plurality of time series for a plurality of properties corresponding to user actions for each user in a set of users. A property, as referred to herein, can include a time that a user accesses a database, a time that a user accesses a file, a type of file or directory or database table that is accessed, a number of accessed files or directories, a number of database transactions, name of file or database, the type of action performed on a file or database (e.g., read or write), and the like. In some examples, a time series, as referred to herein can indicate sequential values corresponding to the properties based on time. For example, values corresponding to the properties may change with time. In some examples, users can access a different number of files based on a time of day, a time of year, or any other time period. A user may also access different databases, store information in different databases, and the like, based on different time periods. In some examples, the time series can include a change in lines of code of an application or database, among others. The user tracking manager can store the properties in the form of time series, or in the form of aggregate statistics, e.g., the running averages and standard deviation of the time series instead of the time series itself.

At block 204, a clustering manager 126 can separate users into clusters based on the data collected by the user tracking manager in the first set of plurality of time series or aggregate statistics. In some embodiments, the clustering manager 126 is executed repeatedly every specified time period, e.g., every week. In some embodiments, the clustering manager 126 can group users with similar time series values or statistics into a single cluster.

At block 206, a cluster identity manager 128 can assign names or identifiers to each cluster. For example, the clustering manager 126 can detect in a first time period that a cluster includes users or members {A,B,C,D,E,F,G}, and cluster that includes users or members {H,I,J,K}. The clustering identity manager 128 will assign them with arbitrary identities: C1={A,B,C,D,E,F,G} and C2={H,I,J,K}. In a subsequent time period, the cluster manager may detect different clusters: {A,B,C,D,E,F} and {G,H,I,J,K}. The cluster identity manager 128 may assign these new clusters with the same identifiers as the previous clustering result by looking at common members. For example, the cluster identity manager 128 can detect that the new cluster {G,H,I,J,K} has many common members with the cluster identified as C2 in a previous time period. Accordingly, the cluster identity manager 128 can identify a cluster having members {G,H,I,J,K} as C2, and the cluster having members {A,B,C,D,E,F} as C1. In some examples, the cluster identity manager 128 can identify a cluster based on common membership that exceeds a predetermined threshold, detecting that a cluster's centroid distance from a previous cluster's centroid does not exceed a predetermined threshold, or any combination thereof.

At block 208, a cluster properties time series manager 130 tracks the changing properties of the clusters produced by the cluster identity manager 128 and creates a second set of time series. In some examples, the cluster properties time series manager 130 can detect and create a cluster membership time series. For example, the cluster properties time series manager 130 can detect that a user belongs to a cluster C1 during a first time period and a second time period, and then the user belongs to cluster C2. The cluster properties time series manager 130 can also detect that the user returns to cluster C1. Accordingly, the cluster properties time series manager 130 can generate a cluster membership time series for the user with the entries: C1, C1, C2, and C1. In some examples, each entry in the time series can correspond to the user belonging to a cluster for a week or any other suitable time period. In some examples, the cluster time series can later be used to detect anomalies. For example, a user moving to a cluster C3 when the time series only contains cluster C1 and cluster C2 entries could be detected as an anomaly.

Still at block 208, in some embodiments, the cluster properties time series manager 130 can also maintain a time series indicating a percentage of users that have moved between clusters. For example, the cluster properties time series manager 130 can track a pair of clusters C1 and C2 and detect a percentage of users that have moved between clusters C1 and C2. A zero value can indicate that no users have moved between clusters C1 and C2, a twenty percent value can indicate that twenty percent of the users of cluster C1 have moved to cluster C2, and the like.

In some examples, the cluster properties time series manager 130 can calculate a cluster centroid for each cluster. The cluster centroid, as referred to herein, can be based on statistics calculated by the user tracking manager 124, of members of detected clusters. Referring to Table 1 above, the centroid of cluster C1 with users A, B, and C, would be (25%, 5%, 85%), since these are the average usages of database tables X, Y and Z respectively, when the values of users A, B, and C are averaged.

In some embodiments, the cluster properties time series manager 130 can use this centroid to create a multi-dimensional time series, wherein a vector exists at each point in time rather than a single number. For example, cluster properties time series manager 130 can monitor or track the centroid of cluster C1. In week 1, the cluster properties time series manager 130 may detect the centroid (25%, 5%, 85%), in week 2 the cluster properties time series manager 130 may detect the centroid (30%, 0%, 80%), and in week 3 the cluster properties time series manager 130 may detect the centroid (30%, 5%, 90%). Accordingly the time series may include the following values: (25%, 5%, 85%), (30%, 0%, 80%), and (30%, 5%, 90%). This time series can later be used for anomaly detection. For example, if next week the value is (70%, 80%, 0%), which deviates from previous entries in the time series, the latest value may be considered an anomaly.

Still at block 208, in some embodiments, the cluster properties time series manager 130 can also detect additional cluster properties. For example, the cluster properties time series manager 130 can also create a time-series from the number of members in a cluster. For example, a cluster C1 may have 3 members (A,B,C) in a first week, then two members (A,B) in a second week, and three members (A, B, and D) in a third week. The cluster properties time series manager 130 may generate a time series with entry values 3, 2, and 3. In some examples, the cluster properties time series manager 130 can also user a cluster diameter, variance of the distance of each member and a centroid, etc. to generate time series.

At block 210, a cyber security manager 132 can detect an anomalous event or anomaly based on a new time series value and the other time series values. For example, the cyber security manager 126 can detect that a user has transitioned from a first cluster to a second cluster, which based on the time series, has not previously occurred. For example, a cluster C1 may contain users that behave like typical basic users, while cluster C2 contains users that behave like typical administrator users. A time series of cluster membership of some particular user may indicate this user is always in cluster C1. If at some time period this user is assigned to cluster C2, the cyber security manager 132 may detect this is an anomalous event, and may block any further activity of this user.

In some embodiments, the cyber security manager 132 can detect a time series of numbers X1, X2, X3, . . . , Xn, and compute the mean and standard deviation of this time-series. Upon detecting a new value Xn+1, the cyber security manager 132 can determine if the new value Xn+1 is close to the mean of the time series. If the new value Xn+1 is more than a predetermined number of standard deviations away from the mean of the time series, the new value can be designated as an anomaly. In some examples, the cyber security manager 132 can apply this technique to any time-series of numbers such as a time series that tracks cluster size, cluster transitions, and the like. In some examples, the cyber security manager 132 can also use techniques for anomaly detection for a time series of categorical values such as cluster membership values. The cyber security manager 132 can also use techniques for anomaly detection for a multi-dimensional time series such as the time series generated for cluster centroids discussed above.

In some embodiments, the cyber security manager 132 can also detect an anomaly if a cluster membership time-series indicates users A and B are always together in the same cluster, but transition to different clusters in a new time period. The cyber security manager 132 can also detect an anomaly if users A and B are never in a same cluster of a cluster membership time-series, and then the users A and B are in the same cluster in a new time period. In some examples, the cyber security manager 132 can use multi-variate anomaly detection techniques that operate on multiple time-series.

In some embodiments, the cyber security manager 132 can generate an anomalous score indicating the anomalous event. In some examples, the anomalous score can be based on time series data used to calculate an average, weighted average, exponential average, a value based on linear or quadratic regression, or any other suitable mathematical value. The cyber security manager 132 can assign an anomalous score to the recent activity of a user based on the calculated value from a time series. In some examples, the cyber security manager 132 can detect a seasonal change in the time series and normalize the time series based on the seasonal change. For example, the time series may exhibit change in mean during the night, or during the weekends, or during holiday seasons.

At block 212, a system monitor 134 can execute a prevention instruction in response to detecting an anomalous event. For example, the prevention instruction can prevent further activity of the user which the anomalous event is associated with. In some embodiments, the system monitor 134 can prevent a user from accessing files, directories, or databases, modifying data stored in files, directories, or databases, changing permissions associated with files, directories, or databases, and the like. In some embodiments, the system monitor 134 can block a database user, or block a user from performing queries on a dataset, among others.

The process flow diagram of FIG. 2 is not intended to indicate that the operations of the method 200 are to be executed in any particular order, or that all of the operations of the method 200 are to be included in every case. Additionally, the method 200 can include any suitable number of additional operations.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical functions. In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 3:
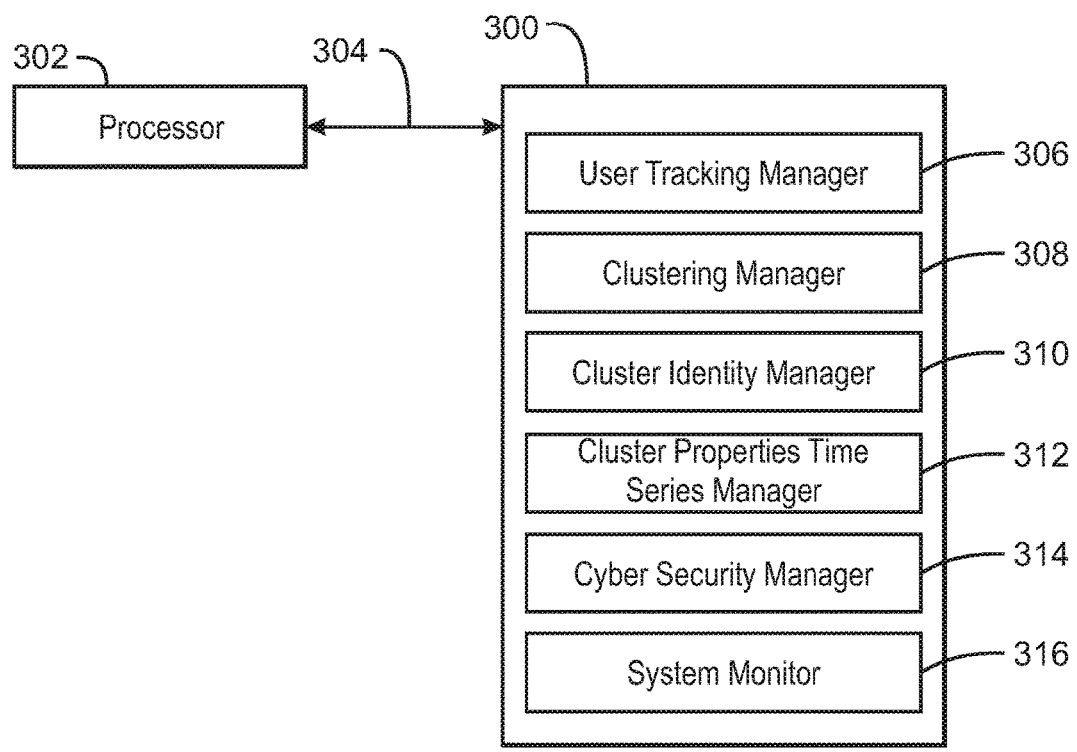
FIG. 3 is a tangible, non-transitory computer-readable medium that can detect a cyber security event based on a time series according to an embodiment described herein.

Referring now to FIG. 3, a block diagram is depicted of an example of a tangible, non-transitory computer-readable medium that can detecting cyber security events. The tangible, non-transitory, computer-readable medium 300 may be accessed by a processor 302 over a computer interconnect 304.

Furthermore, the tangible, non-transitory, computer-readable medium 300 may include code to direct the processor 302 to perform the operations of the current method. For example, a user tracking manager 306 can generate a first time series based on a plurality of properties corresponding to user actions for each user in a set of users. In some embodiments, a clustering manger 308 can separate the set of users into a plurality of clusters based on the first time series or aggregate statistics for each user. In some examples, a cluster identity manager 310 can assign an identifier to each of the plurality of clusters. In some embodiments, a cluster properties time series manager 312 can generate a second time series based on detected changes in the plurality of clusters, wherein the detected changes correspond to a change in cluster membership or a change in a cluster property. In some embodiments, the cyber security manager 314 can detect an anomalous action based on a new value in the second time series. For example, a user transitioning between certain clusters may indicate an anomalous action. In some examples, the system monitor 316 can execute a prevention instruction in response to detecting the anomalous action.

It is to be understood that any number of additional software components not shown in FIG. 3 may be included within the tangible, non-transitory, computer-readable medium 300, depending on the specific application. Furthermore, fewer software components than those shown in FIG. 3 can be included in the tangible, non-transitory, computer-readable medium 300.

Figure 4:
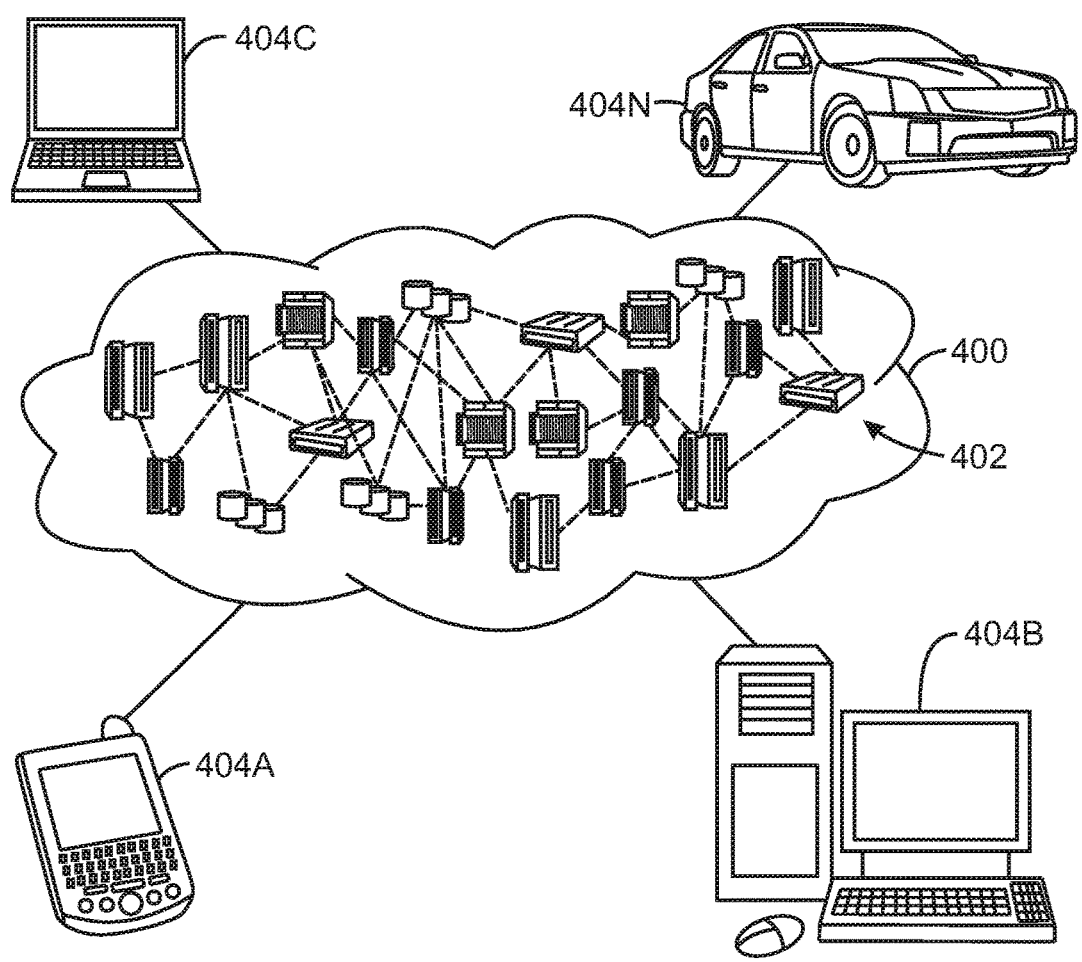
FIG. 4 depicts an illustrative cloud computing environment according to an embodiment described herein.

Referring now to FIG. 4, illustrative cloud computing environment 400 is depicted. As shown, cloud computing environment 400 comprises one or more cloud computing nodes 402 with which local computing devices used by cloud consumers, such as, for example, personal digital assistant (PDA) or cellular telephone 404A, desktop computer 404B, laptop computer 404C, and/or automobile computer system 404N may communicate. Nodes 402 may communicate with one another. They may be grouped (not shown) physically or virtually, in one or more networks, such as Private, Community, Public, or Hybrid clouds as described hereinabove, or a combination thereof. This allows cloud computing environment 400 to offer infrastructure, platforms and/or software as services for which a cloud consumer does not need to maintain resources on a local computing device. It is understood that the types of computing devices 404A-N shown in FIG. 4 are intended to be illustrative only and that computing nodes 402 and cloud computing environment 400 can communicate with any type of computerized device over any type of network and/or network addressable connection (e.g., using a web browser).

Figure 5:
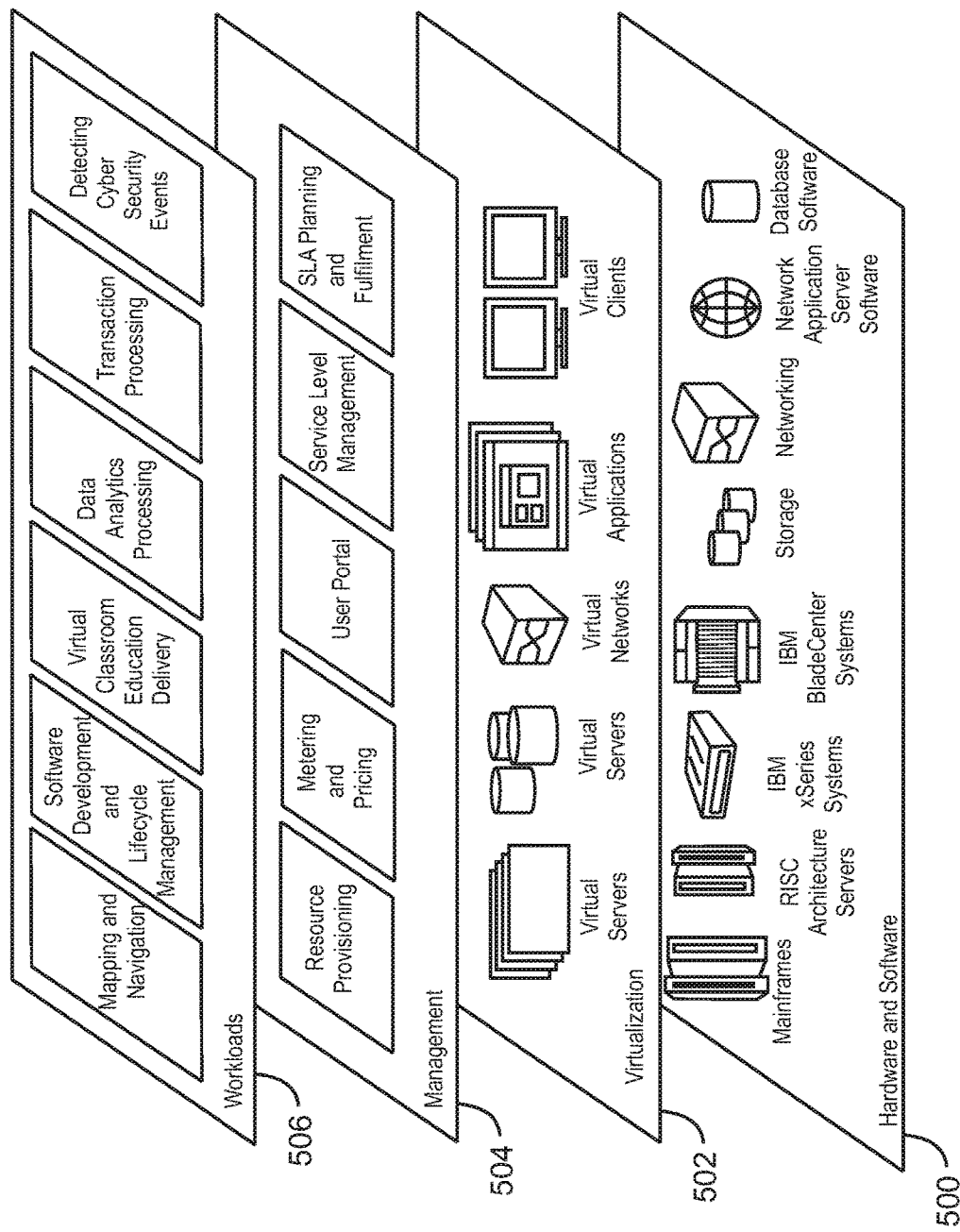
FIG. 5 depicts a set of functional abstraction layers provided by a cloud computing environment according to an embodiment described herein.

Referring now to FIG. 5, a set of functional abstraction layers provided by cloud computing environment 400 (FIG. 4) is shown. It should be understood in advance that the components, layers, and functions shown in FIG. 5 are intended to be illustrative only and embodiments of the invention are not limited thereto. As depicted, the following layers and corresponding functions are provided.

Hardware and software layer 500 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 502 provides an abstraction layer from which the following examples of virtual entities may be provided: virtual servers; virtual storage; virtual networks, including virtual private networks; virtual applications and operating systems; and virtual clients. In one example, management layer 504 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 506 provides examples of functionality for which the cloud computing environment may be utilized. Examples of workloads and functions which may be provided from this layer include: mapping and navigation; software development and lifecycle management; virtual classroom education delivery; data analytics processing; transaction processing; and detecting cyber security events.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system for detecting cyber security events comprising:
    a memory device: and
    a hardware processor to:
        generate a first set of a plurality of time series and aggregate statistics based on a plurality of properties corresponding to user actions for each user in a set of users;
        separate the set of users into a plurality of clusters based on the first set of the plurality of time series or the aggregate statistics for each user;
        assign an identifier to each of the plurality of clusters;
        generate a second set of a plurality of time series based on properties of the plurality of clusters, wherein the properties of a cluster correspond to a membership, a diameter, and a centroid, the centroid to be calculated for each of the plurality of clusters based on the first set of plurality of time series and the aggregate statistics for each user of each cluster; detect an anomaly based on a new value stored in the second set of plurality of time series; and
        execute a prevention instruction in response to detecting the anomaly.

2. The system of claim 1, wherein the second time series and the first time series correspond to a same time range.

3. The system of claim 1, wherein the hardware processor is to generate an anomalous score indicating the anomaly.

4. The system of claim 1, wherein the hardware processor is to detect a seasonal change in the second set of time series and normalize the second set of time series based on the seasonal change.

5. The system of claim 1, wherein the hardware processor is to detect at least two clusters from two different clustering runs that share a common percentage of users and associate the at least two clusters together to generate a single times series for each of the at least two clusters.

6. The system of claim 1, wherein the hardware processor is to monitor a transition of users from a first cluster to a second cluster and detect the anomaly in response to a user transitioning between a first cluster and a third cluster.

7. The system of claim 6, wherein the first cluster, the second cluster, and the third cluster correspond to administrative rights for a database, wherein the first cluster indicates basic user access, the second cluster indicates expanded user access, and the third cluster indicates administrator access.

8. The system of claim 1, wherein the hardware processor is to detect the anomaly based on a statistical analysis of a time series, wherein a difference between a most recent value in the time series and an average of older values exceeds a predetermined standard deviation threshold.

9. The system of claim 1, wherein the hardware processor is to:
generate a third set of a plurality of time series for each user, wherein each value of the third set of the plurality of time series corresponds to a cluster identity for the user at a particular time; and
detect the anomaly based on a new value stored in the third set of time series.

10. A method for detecting cyber security events comprising:
generating, via a hardware processor, a first set of a plurality of time series and aggregate statistics based on a plurality of properties corresponding to user actions for each user in a set of users;
separating, via the hardware processor, the set of users into a plurality of clusters based on the first set of the plurality of time series for each user;
assigning, via the hardware processor, an identifier to each of the plurality of clusters;
generating, via the hardware processor, a second set of a plurality of time series based on properties of the plurality of clusters, wherein the properties of a cluster correspond to a membership, a diameter, and a centroid, the centroid to be calculated for each of the plurality of clusters based on the first set of plurality of time series and the aggregate statistics for each user of each cluster;
detecting, via the hardware processor, an anomaly based on a new value stored in the second time series; and
executing, via the hardware processor, a prevention instruction in response to detecting the anomaly.

11. The method of claim 10, comprising detecting, via the hardware processor, a seasonal change in the second time series and normalizing the second time series based on the seasonal change.

12. The method of claim 10, comprising detecting, via the hardware processor, at least two clusters from two different clustering runs that share a common percentage of users and associating the at least two clusters together to generate a single times series for each of the at least two clusters.

13. The method of claim 10, comprising monitoring, via the hardware processor, a transition of users from a first cluster to a second cluster and detecting the anomaly in response to a user transitioning between the first cluster and a third cluster.

14. The method of claim 13 wherein the first cluster, the second cluster, and the third cluster correspond to administrative rights for a database, wherein the first cluster indicates basic user access, the second cluster indicates expanded user access, and the third cluster indicates administrator access.

15. A computer program product for detecting cyber security events, the computer program product comprising a computer readable storage medium having program instructions embodied therewith, wherein the computer readable storage medium is not a transitory signal per se, the program instructions executable by a processor to cause the processor to:
generate a first set of a plurality of time series and aggregate statistics based on a plurality of properties corresponding to user actions for each user in a set of users;
separate the set of users into a plurality of clusters based on the first set of the plurality of time series or the aggregate statistics for each user;
assign an identifier to each of the plurality of clusters;
generate a second set of a plurality of time series based on properties of the plurality of clusters, wherein the properties of a cluster correspond to a membership, a diameter, and a centroid, the centroid to be calculated for each of the plurality of clusters based on the first set of plurality of time series and the aggregate statistics for each user of each cluster;
detect an anomaly based on a new value stored in the second time series; and
execute a prevention instruction in response to detecting the anomaly.

16. The computer program product of claim 15, wherein the program instructions cause the processor to detect a seasonal change in the second time series and normalize the second time series based on the seasonal change.

17. The computer program product of claim 15, wherein the program instructions cause the processor to monitor a transition of users from a first cluster to a second cluster and detect the anomaly in response to a user transitioning between the first cluster and a third cluster.

* * * * *